March 15, 1932. A. KOSIAN 1,849,460
SPOTLIGHT
Filed Feb. 3, 1930 2 Sheets-Sheet 1
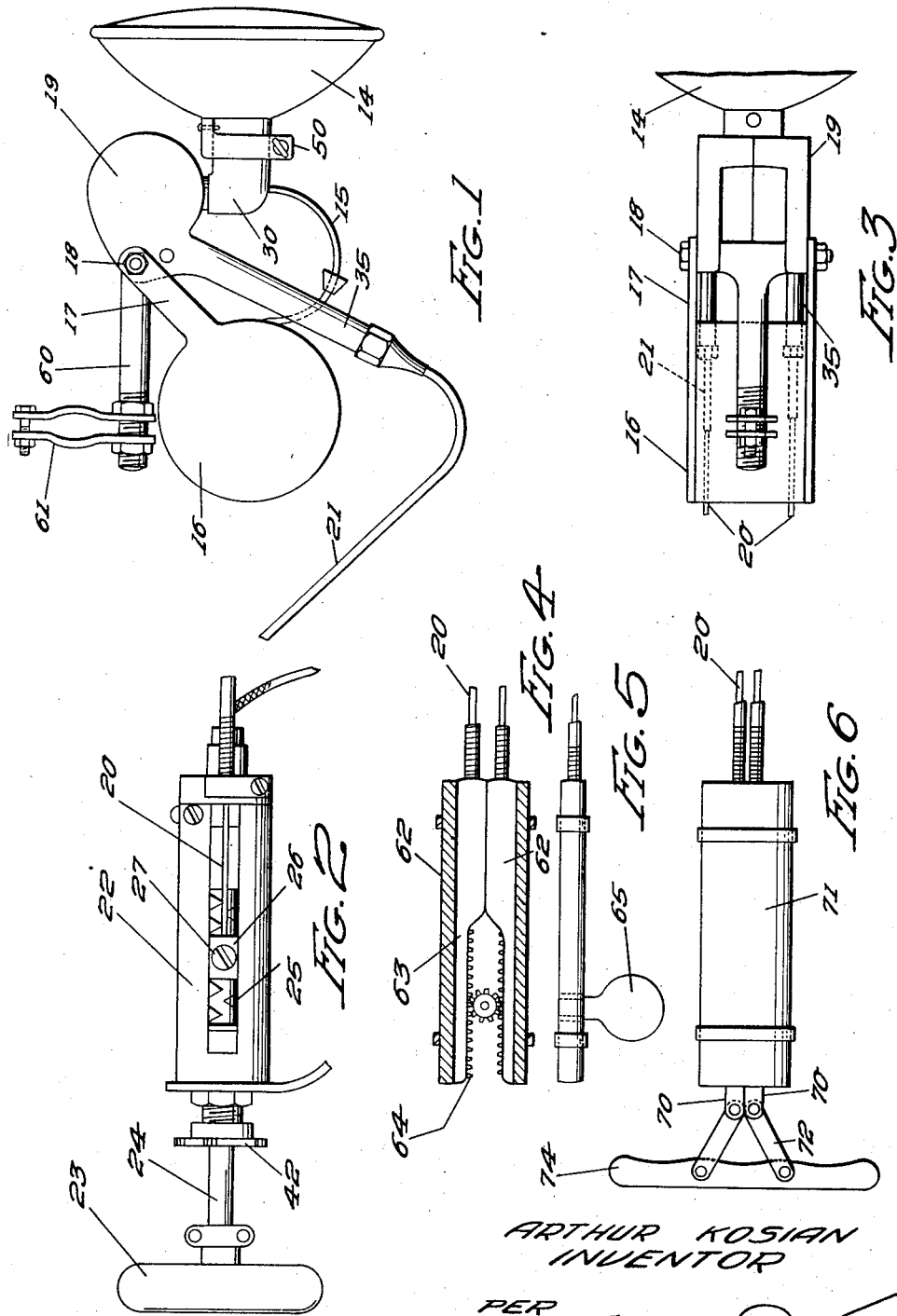
ARTHUR KOSIAN
INVENTOR
PER
Albert J. Fihe
ATTORNEY March 15, 1932.  A. KOSIAN  1,849,460
SPOTLIGHT
Filed Feb. 3, 1930  2 Sheets-Sheet 2
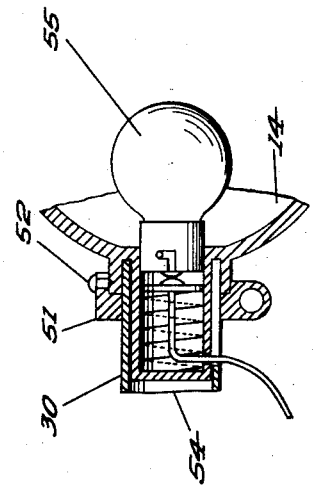
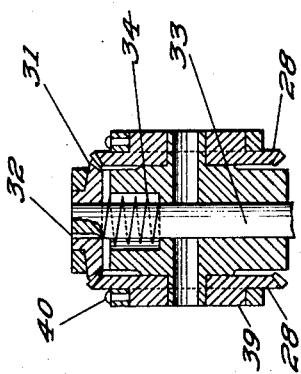
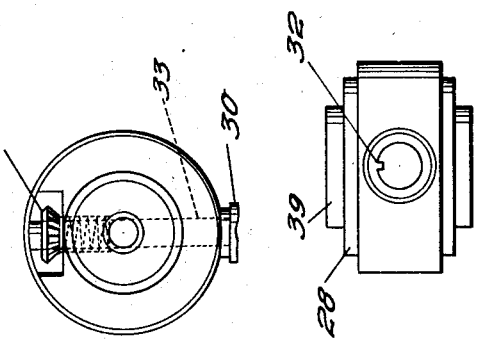
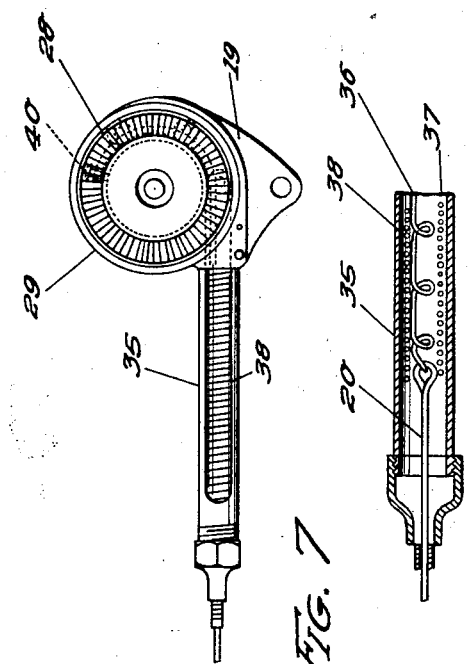
ARTHUR KOSIAN
INVENTOR
PER
ATTORNEY Patented Mar. 15, 1932

1,849,460

UNITED STATES PATENT OFFICE

ARTHUR KOSIAN, OF CHICAGO, ILLINOIS

SPOTLIGHT

Application filed February 3, 1930. Serial No. 425,406.

This invention relates to improvements in spotlights, and has for one of its principal objects the provision of a spotlight for automobiles or the like which can be positively controlled from the dashboard of the automobile or from some other point remote from the light itself.

One of the important objects of this invention is to provide an adjustable spotlight for automobiles or the like which by the operation of a bar, handle or lever may be moved in any direction either horizontally or vertically, and at any desired angle therebetween either alternately or simultantously.

Still another and further important object of this invention is to provide a dirigible spotlight for automobiles which is preferably mounted at the front of the car between or near the usual headlights, and which is controlled from the dash by a single operating lever for manipulating in all directions, the operating lever also including a switch for controlling the supply of current to the lamp itself.

Another and still further important object of the invention is the provision of a combination automobile spotlight and trouble lamp whereby the spotlight may be conveniently and readily removed from its position in front of the automobile and carried to the rear or any portion of the car for the purpose of making repairs to tires, the motor, or the like.

This invention constitutes a companion case to applicant's preceding invention entitled "Adjustable headlight", filed August 13, 1929, Ser. No. 385,494.

Other and further important objects of the invention will be apparent from the disclosures in the accompanying drawings and following specification.

The invention, in a preferred form, is illustrated in the drawings and hereinafter more fully described.

In the drawings:

Figure 1 is a side elevation of the improved spotlight of this invention showing the lamp guard housing attached thereto.

Figure 2 is a side elevation of the preferred form of operating handle, and its attachments.

Figure 3 is a top plan view of that portion of the device shown in Figure 1.

Figure 4 is a side elevation of a modified form of operating handle.

Figure 5 is a top plan view of the device shown in Figure 4.

Figure 6 illustrates another modified form of operating handle.

Figure 7 is a detail view partly in section showing one of the differential gears adapted for pivoting and also vertically shifting the lamp.

Figure 8 is an enlarged sectional detail view of the rear end of the apparatus shown in Figure 7.

Figure 9 is a side elevation of the inner portion of the lamp support housing illustrating the gear by means of which pivotal shifting of the lamp is accomplished.

Figure 10 is a top plan view of the device shown in Figure 9.

Figure 11 is a sectional view showing the differential gear assembly for both pivoting and vertically shifting the lamp.

Figure 12 is a detail sectional view illustrating the preferred method of mounting the lamp and connecting cord for quick removal.

Figure 13 is a bottom plan view of the removable support for the lamp housing.

As shown in the drawings:

The reference numeral 14 indicates generally a lamp casing having the usual current supplying wire 15 which in this adaptation of the invention is housed in a casing 16 and mounted on a spring-operated drum in a well-known manner so that a considerable length of the current carrying wire 15 can be withdrawn whenever it is desired to move the lamp to a remote part of the automobile. The housing 16 is supported by means of bifurcated arms 17 fastened by means of bolts and nuts 18 to the housing 19 for the lamp operating elements. These bolts and nuts 18 also serve to maintain the portions of the casing 19 in proper assembled relation to each other and also to the interior parts.

A pair of operating wires such as piano wires or the like 20 extend rearwardly through flexible housings 21 to the lamp operating handle housing 22, which is preferably positioned on the dash of the automobile, the steering wheel post or some other conveniently accessible spot.

An operating handle 23 is mounted on a rod 24 which passes into the housing 22 and terminates in a double-threaded screw 25, this having co-operating therewith similarly screw-threaded blocks 26 to which the ends of the wires 20 are fastened by means of set screws or the like 27.

The housing 22 is of a sufficient length so as to enable the double-threaded screw 25 to be shifted longitudinally therein, thereby forcing both of the piano wires 20 either forwardly or rearwardly simultaneously, and accordingly rotating two opposed bevel gears 28 simultaneously about their pivotal points 29 in the casing 19 whereby the lamp 14 and its support 30 is moved either upwardly or downwardly in a vertical plane. The details of the operating handle and its housing connections have been more fully described in applicant's co-pending application, as identified above.

As also set forth in the previous application, a rotation of the handle 23 will shift one of the blocks 26 forwardly and the opposing block rearwardly simultaneously, thereby causing a forward motion of one of the wires 20 and a rearward motion of the other wire. This results in a clockwise rotation of one of the gears 28 and a counter-clockwise rotation of the opposite gear, thereby imparting a corresponding rotative movement to the bevel gear 31 which is mounted in the top of the casing 19 and connected by means of a key 32 to the shaft 33 which extends downwardly through the casing and is in turn connected to the support 30 upon which the lamp housing 14 is mounted. A helical spring 34 surrounds the upper portion of the shaft 33 and acts to maintain the bevel gear 31 in proper operating position at all times.

In order to insure a positive operation of the bevel gears 28, the ends of the piano wires 20 terminate in loops projecting for a short distance into the outer ends of tubular housings 35 either integral with or forming extensions of the housing 19. To the ends of the wires 20 is then attached the ends of other similar wires 36 which for added stiffness and resiliency are bent into loops as shown at 37 in Figure 8, these loops being at short distances apart along the lengths of these wires. Each of the wires 36 is then housed in a resilient casing comprising a closely-coiled helical spring 38 which fits quite closely into the interior of the tubing 35 and also fits quite closely into the angle formed by the projecting shoulders 39 of the gears 28 and the corresponding interior faces of the housing 19. The ends of each of the wires 36 are then attached by means of machine screws or the like 40 to the peripheries of the shoulders 39 of the gears 28. It will be seen that in this way is provided a positive rotative operation of the gears 28 while at the same time allowing of a certain resiliency of movement which avoids undesirable stiffness in operation of the handle 23.

A lock nut 42 is provided surrounding the shaft 24 upon which the handle 23 is fitted so that the handle can be locked in any desired position by tightening of the lock nut 42, thereby insuring against any jolting of the lamp casing 14 from a desired adjusted position.

In the event that the lamp is to be removed for the purpose of changing tires, motor repairs or the like, a wing nut 50 is provided in a band 51 adjacent the point of connection with the lamp housing 14 to the support 30, the lamp housing itself being locked in desired position with respect to an annular ring 51 by the set screw 52. A loosening of the wing nut 50 enables the lamp housing 14 to be withdrawn from the socket which forms the lower end of the housing 30, and at the same time the cylindrical casing 54 for the base of the lamp globe 55 will also be withdrawn, this socket 54 having entering into its lower rear end of the current carrying wire 15. Obviously, therefore, the lamp housing 14 together with the attached current carrying wire 15 can be moved to any desired portion of the automobile. The current carrying wire 15 slides out forwardly through a slot 56 formed in the lower face of the casing 30. A suitable supporting arm 60 together with a clamping bracket 61 is provided for the device whereby the same can be readily mounted upon any convenient portion of an automobile such as the cross bar connecting the headlights or some similar contrivance.

In Figure 4 is illustrated a modified form of operating handle for the lamp, this comprising essentially a pair of opposed racks 62 slidably mounted in a housing 63, the racks having fitted therebetween a gear wheel 64, the rotation of which by means of a handle 65 will cause one of the racks to move forwardly and the other to move rearwardly simultaneously. A forward or rearward motion of the handle 65 itself will cause a corresponding simultaneous movement of both of the racks, thereby shifting the lamp housing through a vertical arc as distinguished from its movement in a horizontal arc which is accomplished by the turning of the handle 65.

Another modification of the operating handle is illustrated in Figure 6 whereby a pair of slidable bars 70 is positioned in a housing 71, the rear ends of the bars being connected to the piano wires 20, and their forward ends being connected by links 72 to an operating handle 74 which can be either tilted or moved forwardly or rearwardly as desired, thereby accomplishing either a selective or a simultaneous angular and turning movement of the lamp housing.

It will be obvious that herein is provided a spotlight for automobiles which has a very simple yet efficient controlling movement comprising only two operating wires while at the same time the apparatus provides for free motion in both vertical and horizontal planes, either simultaneously or alternatively and at the same time allowing of such movement through arcs of approximately 180° in any direction, thereby constituting a practically universal movement for all desired purposes. Additionally, there is provided a removable feature of the lamp, which allows of the transferring of the same to remote points of the car for other purposes.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. An adjustable headlight mounted for motion in two planes and a single remote control therefor, said remote control comprising a pair of flexible shafts, a differential gear construction at one end of the shafts and a double-threaded screw at the other ends, said differential gear construction including stiffened helical wire springs acting as flexible push-rods for operating said gears.

2. An adjustable headlight mounted for motion in two planes and a single remote control therefor, said remote control comprising a pair of flexible shafts, a differential gear construction at one end of the shafts and a double-threaded screw at the other ends, said differential gear construction including reinforced shiftable looped wires for operating said gears.

3. An adjustable spotlight mounted for motion in two planes and a single remote control therefor, said remote control comprising a pair of flexible shafts, a differential gear construction at one end of the shafts and a double-threaded screw at the other end, said differential gear construction including a looped wire in a helical spring housing for operating said gears, said double-threaded screw construction including a sleeve in which the screw is mounted and riders for the screw slidably mounted in the slots in the sleeve, said flexible shafts to be connected at one end to the screw riders, and at the other end to the looped wire, and an operating handle for the lamp positioned at the rear of the screw-containing sleeve and mounted for both slidable and turning motion therein.

4. An adjustable spotlight mounted for motion in two planes and a single remote control therefor, said remote control comprising a pair of flexible shafts, a differential gear construction at one end of the shafts and a double-threaded screw at the other end, said differential gear construction including a looped wire in a helical spring housing for operating said gears, said double-threaded screw construction including a sleeve in which the screw is mounted and riders for the screw slidably mounted in the slots in the sleeve, said flexible shafts to be connected at one end to the screw riders, and at the other end to the looped wire, and an operating handle for the lamp positioned at the rear of the screw-containing sleeve and mounted for both slidable and turning motion therein, the spotlight housing being removable as a lamp unit from its mounting.

In testimony whereof I affix my signature.

ARTHUR KOSIAN.